G. H., G. A. AND T. E. FROGGATT.
RECORDING DEVICE.
APPLICATION FILED MAR. 3, 1919.

1,338,647.

Patented Apr. 27, 1920.
2 SHEETS—SHEET 1.

Inventors
GEORGE H. FROGGATT
GEORGE A. FROGGATT
THOMAS E. FROGGATT
By Shigley & Harney
Attorneys G. H., G. A. AND T. E. FROGGATT.
RECORDING DEVICE.
APPLICATION FILED MAR. 3, 1919.

1,338,647.

Patented Apr. 27, 1920.
2 SHEETS—SHEET 2.

Inventors
GEORGE H. FROGGATT
GEORGE A. FROGGATT
THOMAS E. FROGGATT

By Shigley & Harney
Attorneys

UNITED STATES PATENT OFFICE.

GEORGE H. FROGGATT, GEORGE A. FROGGATT, AND THOMAS E. FROGGATT, OF COLUMBUS, OHIO.

RECORDING DEVICE.

1,338,647.   Specification of Letters Patent.   Patented Apr. 27, 1920.

Application filed March 3, 1919. Serial No. 280,436.

*To all whom it may concern:*

Be it known that we, GEORGE H. FROGGATT, GEORGE A. FROGGATT, and THOMAS E. FROGGATT, citizens of the United States of America, residing at Columbus, in the county of Franklin and State of Ohio, have invented certain new and useful Improvements in Recording Devices, of which the following is a specification.

Our present invention relates to improvements in recording devices designed especially for use in connection with platform, beam scales, and herein specifically adapted to be operated by the weight of a loaded mining car, on the tracks of the scale platform.

The primary object of our invention is the provision of an automatically operated recording device that will perforate a strip, or print or otherwise mark upon the strip, the weight of a given load as it passes onto and over the platform of the scale mechanism.

To this end the invention includes a recording mechanism utilizing a movable, continuous strip of paper or other suitable material, which may be perforated to record the weight of the load, or the weight of the load may be indicated on the strip by a stamp, and the recording device, comprising a die wheel and hammer, with operating devices, is automatically operated by the movement of the weighing beam due to the weight of the load on the platform of the scales.

The invention consists in certain novel combinations and arrangements of parts for actuating and operating the recording device, as will be hereinafter set forth and claimed.

In the accompanying drawings one complete example of the physical embodiment of the invention, adapted for use with a platform scale, is illustrated, the parts being combined and arranged according to the best mode so far devised for the practical application of the principles of the invention.

In the drawings Figures 1 and 2 are diagrammatic views of the invention, showing an end view and a top plan view.

Fig. 3 is an elevation of the recording mechanism, showing also part of the scale or weighing mechanism, at line 1—1 of Fig. 1.

Fig. 4 is a transverse sectional view on line 3—3 of Fig. 3.

Fig. 5 is an enlarged view showing the weight recording die and hammer and the feed or intermittently operated device for the tape or strip.

Fig. 6 is a sectional view through the platform of the scale on line 2—2 of Fig. 1 or line 4—4 of Fig. 4.

Fig. 7 is a plan view of Fig. 6.

Fig. 8 is an enlarged sectional view at line 5—5 of Fig. 6.

Fig. 9 is a portion of the mechanism of Fig. 6 showing the actuating levers in operated position.

Fig. 10 is a plan view of Fig. 9.

Fig. 11 is a sectional view similar to Fig. 8 showing the levers in normal position.

We have depicted the subject matter of the invention in the drawings in connection with a platform, scale of the beam type, the platform 1 being located between the rails 2—2 of the mine railroad track, and the tracks 3—3 of the platform are depressible therewith when a loaded car passes onto the platform, as usual. The beam 4 of the scales is depressed, through its connections to the platform, and the weight of the load is indicated on the chart 5 by the needle or pointer 6, in Fig. 3. Each weighing process of the scales is recorded by the recording mechanism, and thus the recorder is intermittently operated, and the succeeding operations of weighing the load (carloads of coal in this instance) are thus recorded on the strip 7 which is allowed to be gathered in the box or housing 8 of the recording mechanism.

The strip or tape 7 may be of paper or other suitable material and is fed from the tape reel 9, supported in the frame 10 fixed within the housing 8, with an intermittent movement through the instrumentality of the pair of feed rollers 11 and 12, the former an idler and the latter fixed on the feed shaft 13 journaled in the frame. The tape passes through guides 14 and 15 which keep it alined for the recording wheel 16, and a friction brake 17 prevents excess movement of the supply reel with consequent slackness in the tape. The feed shaft is revolved through the medium of the ratchet wheel 18 fixed thereon, the wheel or disk having protruding at one side near its periphery, a series of pins or studs 19, which are engaged by the ratchet 20, the ratchet wheel being revolved one space as the ratchet is lifted while engaged under one of the studs. The ratchet is provided with a weight 20' to hold it in proper position to engage the studs, and is pivoted at 21 on the free end of the recording hammer 22 in the shape of an arm pivoted at 23 inside the housing, and formed with a head 24 to co-act with the recording wheel 16.

At 25 are indicated record marks on the periphery of the recording wheel, which co-act as dies with the hammer head 24, the hammer by its blow imprinting on the tape the mark of the die. In normal position the hammer is held just over the center line of the recording wheel in position to permit movement of the tape between it and the wheel, a spring 25 being attached at the under side of the hammer arm 22 with its lower end attached to the frame 10 at 26, and when the blow of the hammer is to be struck, the hammer is raised on its pivot against the tension of the spring, and when released the hammer is operated by the spring to impart the blow to the tape on the die or recording wheel.

The recording shaft 27, the feed shaft 13 and the hammer are operated by a set of co-acting levers supported on the platform 1 and lying alongside the platform track 3 in position to be actuated by the passing wheel, (indicated at 28) of a mine car moving in the direction of the arrows. The shaft 27 is revolved clockwise by the scale beam 4, when it rises to normal position after having been depressed by the weight of the load on the car, by the movement of the belt 29 attached to the beam at one end and passed around a roller or sleeve 30 at its other end, the roller being fixed on the shaft 27, and this movement of the shaft presents a new die at the top of the recording wheel for recording its mark on the tape with the succeeding hammer blow.

The working stroke of the shaft 27 is stabilized through the counterbalance or weight 31 adjustable on the arm 32 of the revoluble sleeve 33 over which the belt or cord 34 passes, and the cord is attached at one end of a pivoted link 35 connected by a cord 36 which passes partly around the sleeve 37 on the shaft 27, located on the shaft at the opposite side of the recording wheel from sleeve 30.

In Figs. 6 and 9, particularly, are shown the actuating lever and connections for lifting the hammer preparatory to a blow, the lever being indicated at 38 for vertical movement alongside of the track 3. In Fig. 6 the wheel 28 is about to ride down the lever, while in Fig. 9 the weight of the wheel and its car load have depressed the lever, and this action has pulled on the cord or chain 39 which passes around guide pulleys 40 and finally over the upper guide pulley 41 and down to the hammer arm 22 where it is attached at 42. Thus as the wheel rides down the lever 38, the hammer is lifted, and with the hammer the ratchet lever 20 also is lifted, the hook of the ratchet engaging one of the studs 19 and turning the wheel 18 as described, and the parts are held in this position by a spring detent 43, which lies alongside the platform track and is pivoted on the platform at 44. The depressible lever 38 moves vertically, but the detent lever 43 moves horizontally. Thus with the parts in position indicated in Fig. 6 the free end 45 of the lever 38 is elevated and the spring 46 of the detent 43 is holding the free end of the detent in frictional contact with the free end of lever 38. Now when the lever 38 is depressed, it is disengaged from the detent, and the detent is free to swing horizontally under pressure from its spring, and the detent does so swing under the free end of the depressible lever and is held by the lug or stop 46 in its path of movement, thus holding the hammer uplifted and ready to strike.

The hammer is released by the action of the rear wheel of the car as the latter passes from the platform, through the instrumentality of a release, depressible lever 47 alongside the rail 3 in the path of the wheels of the car, which lever is movable vertically on its pivot 48 and connected to the detent lever by a link 49. The lever 47 is positioned in a higher plane than the horizontal lever 43, consequently when lever 47 is depressed, through the connecting link 49, the horizontal detent is withdrawn from over the vertical moving lever 38 which leaves the spring 25 free to pull down the arm 22 of the hammer and the head 24 strikes the tape or strip on the die of the recording wheel printing the record thereon. The records on the wheel 16 correspond with the chart 5 and the needle 6 of the scale is oscillated to proper position from the beam 4 of the scales through the flexible connecting cord 50, lever 51 and cord 52 which passes around the reel 53 of the needle shaft 54.

In normal position in the absence of a load on the platform the scale beam, or rather the end of the beam 4 is down, and in this position the indicator hand or needle 6 is at the O point on the chart 5, and the front wheels of the approaching car ride down the lever 38, to lift the hammer from its normal position to uplifted position ready to strike. The hammer is released, and strikes its blow when the rear wheels of the car have passed over the releasing lever 47 which disengages the detent 43 and permits action of the spring of the hammer. The co-action between the beam 4 as it is elevated by the depression of the platform due to the weight of the loaded car, and the chart 5, and the recording wheel, insures the recording on the tape of the figures on the chart 5 that are indicated by the pointer or needle 6, as the elevating of the beam turns the recording wheel 16 synchronously with the movement of the indicator needle 6. As the car passes off the platform, the latter gradually rises to normal position, the free end of the weighing beam descends and the indicator 6 returns to zero and with it the recording wheel returns to its zero point.

The printed tape may either be permitted to accumulate in folds in the receptacle or housing 8 for future reference, or it may be wound upon a reel as desired. The tape is fed intermittently between the hammer and the die by the action of the ratchet wheel and its ratchet the latter turning the former one space each time the hammer is uplifted thus moving the tape after each imprint thereon.

The printed tape may be cut off and taken out of the housing each day or at any regular intervals and used for checking up the weights of cars that have already been taken from the chart, or if desired an operator in charge of the weighing machine may be dispensed with as it is evident the weighing and recording of the load is automatically performed.

In normal position the hammer is so adjusted that it rests lightly on the tape with such slight friction as to permit the recording wheel to freely return to its normal position after each blow of the hammer. The hammer in its movement, is gradually lifted to operative position, but its working stroke is quickly executed and the hammer rebounds from the tape and recording wheel due to careful adjustment of the actuating parts.

What we claim is—

1. The combination with a platform, weighing means in connection therewith, a die wheel and connections between said die wheel and said weighing means for rotating the said die wheel, of a tape for the die wheel, means for feeding the tape, a spring actuated arm having a hammer head, a depressible lever having flexible connection with said hammer arm for raising and holding the same and means for releasing the hammer arm to permit of working stroke thereof.

2. The combination with a platform, weighing means in connection therewith, a die wheel and connections between said die wheel and said weighing means for rotating the said die wheel, of a tape for the die wheel, a spring actuated hammer arm having a hammer head, a depressible lever having connection with the arm for raising and holding the same and a second lever for holding and releasing the first lever to permit of working stroke of the hammer arm.

3. The combination with a recording wheel, a weighing platform, and weighing means in connection therewith, including a scale beam operatively connected to the platform, and means operatively connecting said recording wheel with the scale beam, of a supply wheel and tape thereon passing over the recording wheel, a pivoted hammer arm having a head to co-act with the recording wheel, a depressible lever having connections to elevate the hammer arm, a second lever retaining the hammer arm in elevated position, a tape feeding ratchet actuated by the hammer arm for feeding the said tape, the said hammer arm controlling levers being located adjacent to the platform and the last mentioned lever being adapted for actuation to release the first lever and permit of working stroke of the hammer arm.

In testimony whereof we affix our signatures.

GEORGE H. FROGGATT.
GEORGE A. FROGGATT.
THOMAS E. FROGGATT.